United States Patent [19]

Walters et al.

[11] 4,398,578

[45] Aug. 16, 1983

[54] DISTRIBUTOR FOR GRAVEL AND SEEDS

[75] Inventors: Gerald A. Walters, Kaneohe; Donovan Goo, Kailua, both of Hi.

[73] Assignee: The United States of America as represented by the Secretary of Agriculture, Washington, D.C.

[21] Appl. No.: 254,682

[22] Filed: Apr. 16, 1981

[51] Int. Cl.³ .............................................. B65B 1/04
[52] U.S. Cl. .................................. 141/238; 222/129.4
[58] Field of Search ................... 141/238, 83, 98, 99, 141/100, 102, 104, 105, 234, 237–244, 359, 9; 222/129.1, 129.3, 129.4, 429, 431, 451; 241/DIG. 17; 53/390; 137/602

[56] References Cited

U.S. PATENT DOCUMENTS 3,987,824 10/1976 Zehnder .............................. 141/238

Primary Examiner—Houston S. Bell, Jr.
Attorney, Agent, or Firm—M. Howard Silverstein; David G. McConnell

[57] ABSTRACT

A distributing device for solid particles of material, such as gravel, seeds, or similar material in the form of small solids to be delivered to containers. The device consists of a four-legged rectangular frame beneath which a rack carrying the containers may be positioned. The frame carries a rectangular bin in which an apertured fixed bottom plate and a similarly apertured top plate are fitted, the apertures of the bottom plate being longitudinally offset relative to the corresponding apertures of the top plate, with a slidable apertured middle plate disposed therebetween, operated by a manual lever arranged to move the middle plate from a receiving position with its apertures registering with those of the top plate to a discharge position with its apertures registering with those of the bottom plate. The rack holds the containers in a configuration such that the containers can be placed in vertical registry with the apertures of the bottom plate. The material in the bin is thus fed in metered amounts via the middle plate apertures so as to discharge into the containers in the rack beneath the frame, responsive to reciprocation of the middle plate by manually rotating the lever back and forth.

11 Claims, 8 Drawing Figures

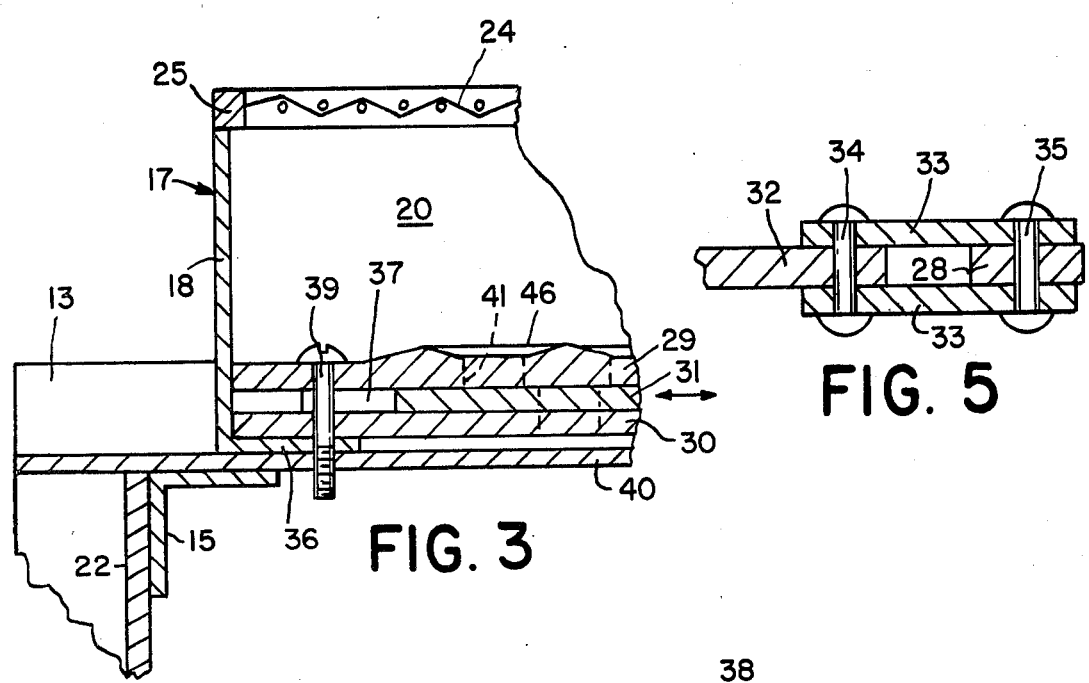
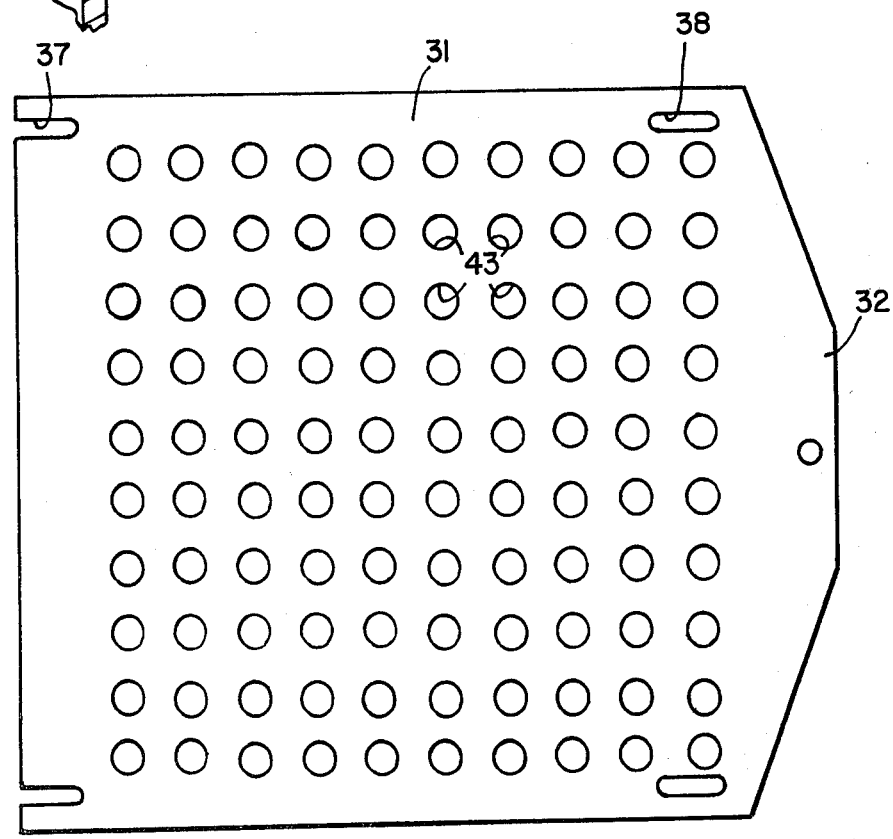

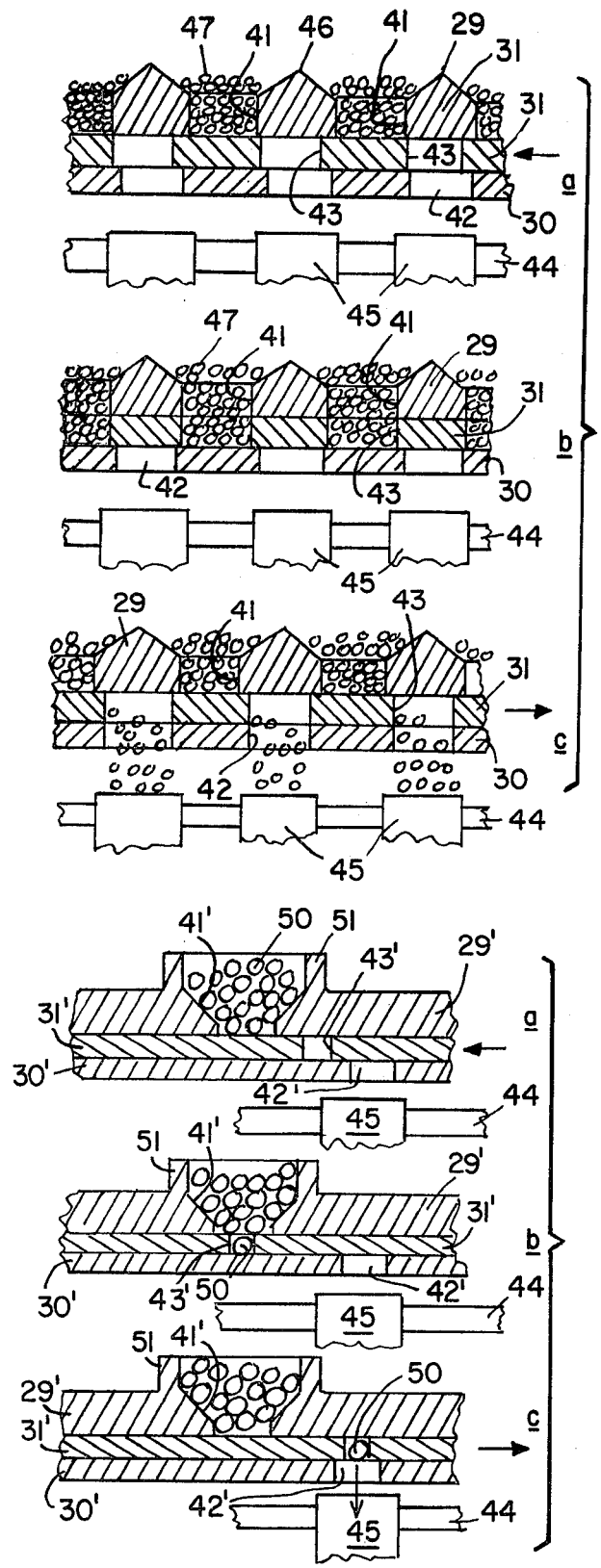
FIG. 6
FIG. 7
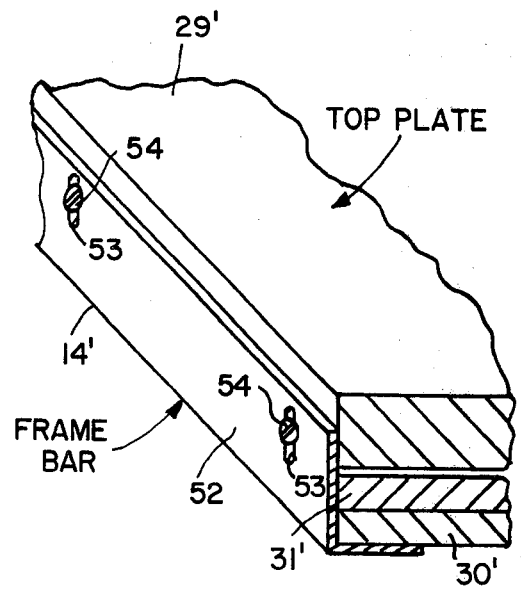
FIG. 8

DISTRIBUTOR FOR GRAVEL AND SEEDS

FIELD OF THE INVENTION

This invention relates to distributing devices for solid material, and more particularly to devices for distributing solid particles of material, such as gravel, seeds, or similar spreadable material in the form of small solid bodies.

BACKGROUND OF THE INVENTION

There is a general need for a simple and accurate apparatus for rapidly distributing material in the form of small solid bodies simultaneously and uniformly into a plurality of spaced containers for further processing. For example, seeds sown in containers must be covered to prevent them from washing away, and to prevent the build-up of moss and algae on top of the containers. A number of devices have been developed to spread covering material, usually granite grit or basalt gravel, over the seed. These prior devices are relatively bulky, mechanically complex, and somewhat unreliable. For example, some of the prior devices employ revolving drum members, rotating discs, or shutter boxes, all of which are quite bulky and expensive, as well as not being satisfactorily precise. Consequently, there is a definite need for a simpler, less expensive, and more accurate manually operable spreader usable with various materials, which can be adapted for use with different types of containers and with different kinds of seed covering materials, or for distributing seeds themselves.

SUMMARY OF THE INVENTION

Accordingly, a main object of the invention is to provide an improved device for distributing small particles of solid material which overcomes the disadvantages and deficiencies of the previously known distributing devices.

A further object of the invention is to provide a novel and improved distributor for small bodies of solid material to be deposited into containers, said distributing device being simple in construction, being easy to operate, and providing accurate metering of the material distributed.

A still further object of the invention is to provide an improved device for spreading covering material, such as gravel, or the like, simultaneously over seeds in a plurality of containers to be planted in the ground, so as to prevent the seeds from being washed away and to prevent the buildup of moss and algae on top of the containers, the spreading device being relatively compact in size, being durable in construction, and providing accurate distribution of uniform amounts of the covering material into the seed containers.

A still further object of the invention is to provide an improved inexpensive distributor for small bodies of solid material, such as individual seeds, for simultaneously guiding individual seeds into a plurality of respective containers for nursery planting, the distributor enabling efficient, accurate, reliable, and economical distribution of the seeds to be performed, and requiring a minimum amount of human supervision.

A still further object of the invention is to provide an improved device for simultaneously distributing particulate solid material into a relatively large number of containers, the device employing only a small number of moving parts, being easy to maintain in proper operating condition, being readily adaptable for use with a variety of different particulate materials, such as gravel, seeds, or other small solids, and being usable to distribute accurately measured uniform amounts of the material simultaneously into a relatively large number of containers.

BRIEF DESCRIPTION OF THE DRAWINGS

Further objects and advantages of the invention will become apparent from the following description and claims, and from the accompanying drawings, wherein:

FIG. 3 is an enlarged vertical cross-sectional view taken substantially on line 3—3 of FIG. 1.

FIG. 4 is a plan view of the slidable distributing plate member employed in the distributor of FIG. 1.

FIG. 5 is an enlarged vertical cross-sectional view taken substantially on line 5—5 of FIG. 1.

FIG. 6 is a series of enlarged fragmentary longitudinal vertical cross-sectional views showing three successive stages of operation of the apertured slidable plate member of FIG. 4.

FIG. 7 is a series of views similar to FIG. 6, but showing a modification of the distributor as employed for distributing round seeds into planting containers.

FIG. 8 is a fragmentary schematic perspective view showing means for adjusting the top plate of a seed distributor according to FIG. 7 to allow for different middle plate thicknesses.

DETAILED DESCRIPTION OF PREFERRED EMBODIMENTS

Figure 1:
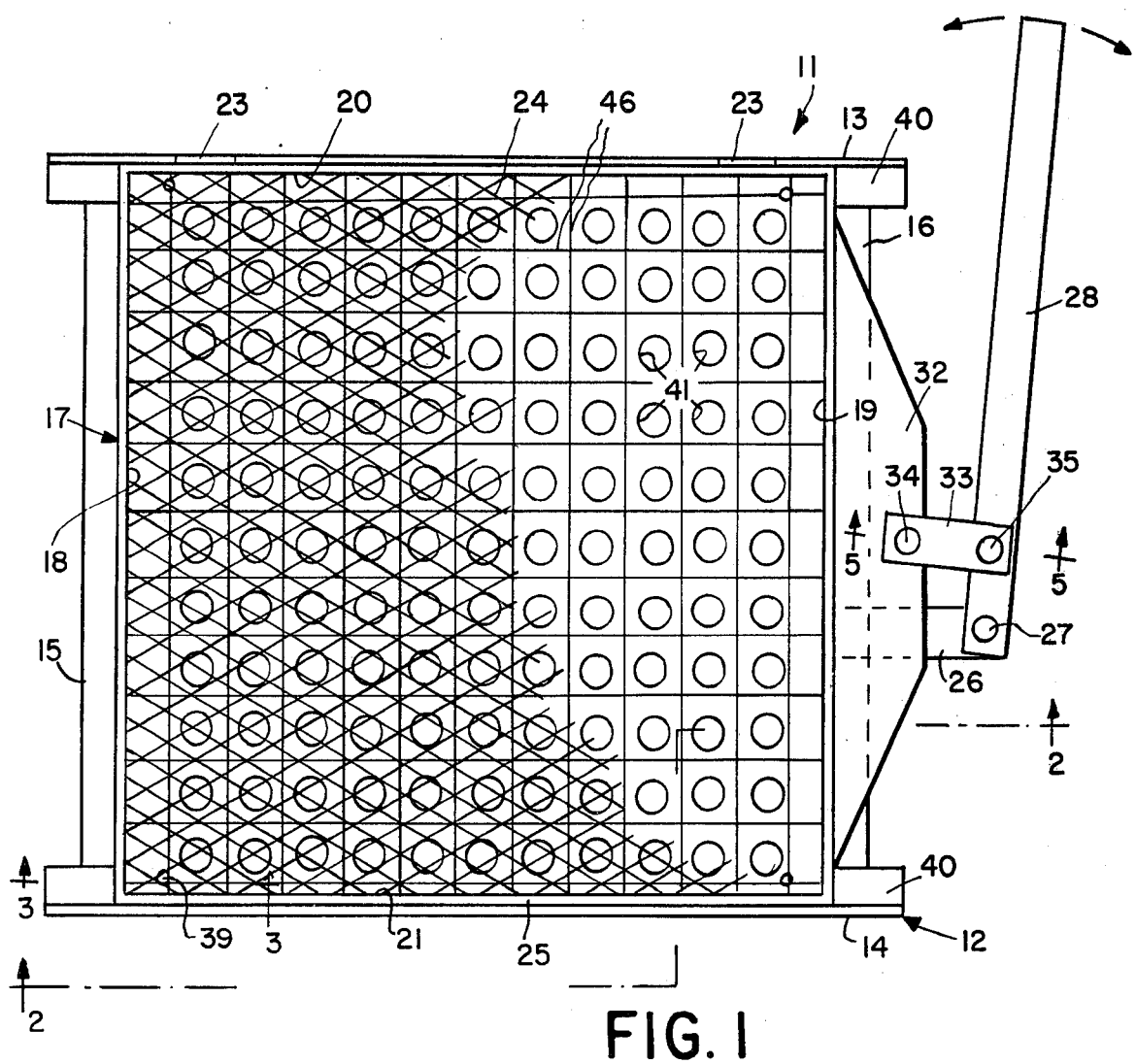
FIG. 1 is a top plan view of a gravel distributor constructed in accordance with the present invention.

Referring to the drawings, 11 generally designates an improved distributing apparatus constructed in accordance with the present invention. The apparatus 11 comprises a rectangular supporting frame 12 which consists of a pair of parallel longitudinal angle bars 13, 14 rigidly secured to transverse angle bars 15, 16, the vertical flanges of longitudinal bars 13, 14 being located outwardly and rising vertically to define a supporting seat for a rectangular box member 17 having transverse vertical end walls 18, 19 and longitudinal vertical walls 20, 21. Rigidly secured to the longitudinal and transverse bars of the frame at their ends are respective depending supporting angle bars 22, defining corner legs for the rectangular frame 12. Hinged at 23, 23 to the top edge of longitudinal wall 20 is a protective screened cover comprising a rigid rectangular frame 25 in which is secured a screen 24, of heavy metal mesh or of expanded metal.

Rigidly secured to transverse frame bar 16 is a forwardly projecting bar member 26. Pivotally connected at 27 to the forward end of bar 26 is the end of an elongated operating lever arm 28.

Fitted within the box member 17 are respective upper and lower apertured rectangular plate members 29 and 30, slidably received therebetween is an apertured middle plate 31. End wall 19 has a horizontal slot 49 through which projects a forward extension element 32 of said plate member 31. The midportion of element 32 is connected to lever arm 28 by parallel top and bottom link bars 33, 33, as shown in FIG. 5, with respective end pivotal connecting pins, shown at 34, 35. Rotation of lever arm 28 shifts middle plate 31 longitudinally relative to top and bottom plates 29 and 30.

Box member 17 is provided with inwardly extending bottom corner flanges 36 (see FIG. 3) which supportingly underlie the corner portions of bottom plate 30. Middle plate 31 has longitudinal rear slots 37 and front slots 38. Respective retaining screws 39 extend through the corner portions of top and bottom plates 29 and 30, through the respective rear and front slots 37,38 of middle plate 31 and through the flanges 36, and are threadedly engaged in the underlying horizontal flanges 40 of the longitudinal frame bars 13,14, thus defining pin means holding the plates 29,30 and box member 17 stationary while allowing limited longitudinal sliding movement of middle plate 31.

Top plate 29 is formed with evenly spaced rows and columns of circular apertures 41 distributed uniformly over its area. Bottom plate 30 is formed with similarly spaced apertures 42 whose axes are longitudinally aligned with but are offset longitudinally from apertures 41, as shown in FIG. 6, so that they are located beneath non-apertured portions of top plate 29. Middle plate 30 has similarly arranged rows and columns of apertures 43 which may be registered with the bottom plate apertures 43, as shown in FIG. 6c, or with the top plate apertures 41 in another position of the middle plate, as shown in FIG. 6b, at which time they are in sealed relationship relative to the bottom plate 30. As previously described, the position of middle plate 31 is controlled by the lever arm 28. The slots 38 are preferably of lengths substantially equal to the required path of travel between the two respective registration positions of the middle plate 31, shown respectively in FIGS. 6b and 6c.

Figure 2:
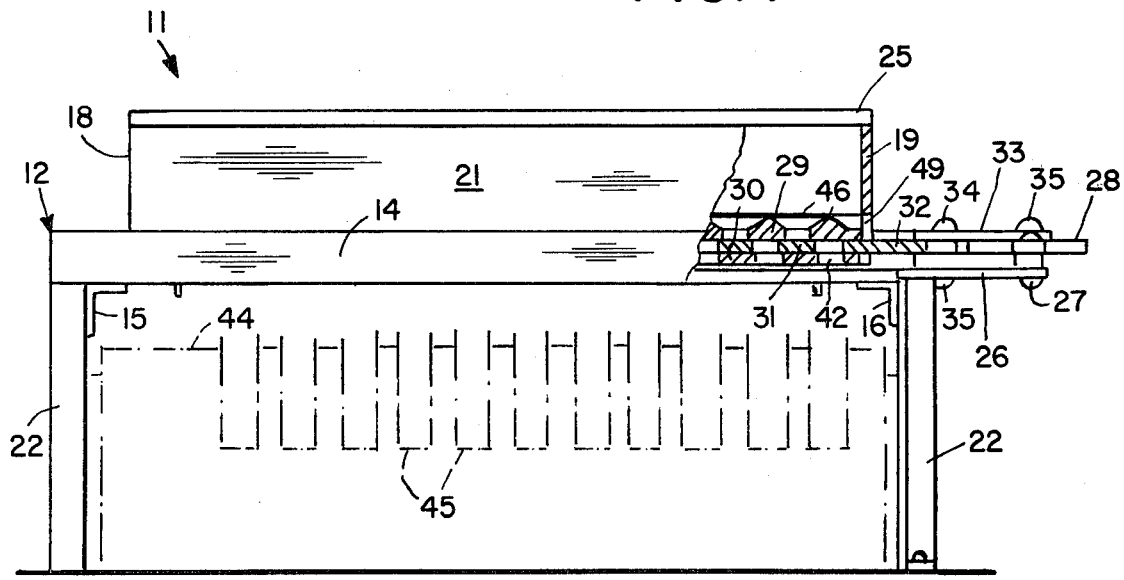
FIG. 2 is a vertical cross-sectional view taken substantially on line 2—2 of FIG. 1.

The frame 12 is adapted to slidably receive a container rack 44 between the rear and front pairs of support legs 22, said container rack being suitably formed to vertically support respective seed containers 45 in rows and columns with their open top ends registering with the apertures 42 of bottom plate 30 when the rack 44 has been inserted to a predetermined position beneath the frame 12. This position of the rack is diagrammatically illustrated in FIGS. 2 and 6.

The top surface of top plate 29 is formed with transversely intersecting ridges 46 located to define downwardly converging guide surfaces leading to the respective apertures 41, thereby facilitating the downward travel by gravity of the gravel 47 toward the apertures.

In the position shown at "a" in FIG. 6, the gravel 47, after having been poured into the box member 17, will accumulate in the apertures 41 but will be blocked by middle plate 31. Rotation of lever arm 28 in a counterclockwise direction, as viewed in FIG. 1, moves middle plate 31 leftward from position "a" to position "b", causing registry of apertures 43 with apertures 41, allowing the gravel to flow downwardly and fill apertures 43. The lever arm 28 is then rotated clockwise to return apertures 43 into registry with the apertures 42 of bottom plate 30, allowing the gravel trapped in apertures 43 to descend into the containers 45 via said apertures 42, as shown at "c" in FIG. 6. The descent of the gravel restores the condition shown at "a", whereby the apparatus is ready for the next gravel distribution cycle.

In a typical embodiment, the gravel spreader 11 consisted of a top storage bin 17 containing the three steel plates 30, 31 and 29, mounted on the steel frame 12, as above described. The storage bin 17 was 3½ inches deep and was provided with a hinged cover comprising an expanded-metal screen 24, to exclude the operator's fingers from the holes 41, 43 in the top and middle plates. The top and middle plates 29, 31 were ⅜ inch steel; the bottom plate 30 was ¼ inch steel. The holes in all three plates were ¾ inch in diameter and had the same arrangement as the containers 45 in the rack 44.

To operate the typical gravel spreader above described, 2 mm gravel is placed on the top plate 29. A rack 44 of containers 45 is placed beneath the frame 12 with the containers 45 in registry with the discharge holes 42. The middle plate 31 is moved by the lever arm 28 so that its holes 43 register with the holes 41 in the top plate 29 (FIG. 6b), causing gravel 47 to fall into each middle plate hole 43. Filling of the middle plate holes is consistent because the ridges 46 between each row of holes 41 cause gravel to continuously fill the holes. Movement of the middle plate causes agitation of the gravel in the top holes, insuring that the holes in the middle plate become filled when lined up with the top plate holes 41. The middle plate is then moved by the lever arm 28 so that the holes 43 line up with the holes 42 in the bottom plate, causing the gravel to fall through to the containers 45 (FIG. 6c). A gravel spreading cycle of placing a rack 44 of containers 45 under the gravel spreader, applying the gravel, and removing the rack, requires about 20 seconds.

The amount of gravel applied depends on the thickness of the middle plate 31 and the diameter of the holes 43 in the middle plate. The above-described typical gravel spreader was designed to apply about ¼ inch of gravel into each container 45. If more gravel is needed, a thicker middle plate 31 can be used, and conversely, if less is needed, a thinner middle plate can be used, the plates being readily removable for the purpose of changing the middle plates.

The hole diameters are fixed by the spacing of the containers 45. In the above-described typical embodiment, the containers were spaced on 1¾-inch centers. This allowed ¾ inch holes 43, 42 to be used without the middle plate holes providing direct gravel flow from the top plate 29 through the bottom plate 30. For containers 45 spaced closer than 1¾-inch centers, smaller holes can be used, or gravel spreading can be done in two steps, every other row at one time.

The above-described gravel spreader 11 conserves gravel because it applies the desired amount directly into the containers 45. There is no excess gravel to be brushed from the top of the racks or swept from the floor.

FIGS. 7 and 8 illustrate a modification of the apparatus for use in feeding round seeds 50 for planting in containers 45. Thus, the apparatus, like the previously described form of the invention comprises a fixed top plate 29', a slidable middle plate 31' and a fixed bottom plate 30'. The top plate has the downwardly convergent holes 41', the middle plate has the holes 43', and the bottom plate has the holes 42', arranged in rows and columns, as in the previously described embodiment. The plates may be made of suitable material, such as plexiglass. The top plate 29' may be relatively thick to provide deep storage holes for the seeds, and the holes may have peripheral upstanding rims 51 to keep the seeds 50 from falling off. The middle plate 31' is about the same thickness as the diameter of the round seeds 50. In a typical embodiment, the top plate 29' is ½ inch thick, with upstanding rims 51 around the holes ½ inch in height, and the bottom plate is about ¼ inch thick. It has been found that the discharge holes in the top and bottom plates preferably should be at least 2.5 times the diameter of the round seeds 50. The holes 43' in the middle plate should be just slightly larger than the seeds, with bevelled top edges to minimize damaging the seed as the plate 31' moves back and forth.

For sowing operation, seeds 50 are placed on the top plate 29' and a rack 44 of containers 45 is placed underneath, with said containers 45 vertically aligned with bottom plate holes 42' (FIG. 8a). Middle plate 31' is then moved so that holes 43' line up with the holes 41' in the top plate. When these holes are aligned, a seed 50 falls into each hole 43' (FIG. 2b), because movement of the middle plate 31' causes agitation of the seeds in the top holes 41'. The middle plate 31' is then retracted so that the holes 43' register with the bottom holes 42', allowing the trapped seeds 50 to fall through to the underlying containers 45 (FIG. 7c).

In the typical embodiment above described, a sowing cycle of placing a rack of containers under the seeder, sowing the seeds, and removing the rack, requires about 15 seconds.

Sowing more than one seed per container is accomplished by sliding the middle plate back and forth. Each reciprocation of the middle plate drops one seed 50 into each container 45.

The same basic seeder can be used for different sizes of round seeds. A different middle plate is required for each size because the thickness of the plate should be about the same as the diameter of the seed. The top plate 29' must be adjustable up or down for different middle plate thicknesses. FIG. 8 illustrates one arrangement for top plate vertical adjustment.

Thus, in FIG. 8, 14' represents one of the longitudinal side angle bars of the seeder frame, which is generally similar to the frame 12 previously described. The upstanding flanges 52 of the longitudinal side bars (on both sides of the frame) are formed with longitudinally spaced vertical slots 53 located adjacent the longitudinal side edges of the top plate 29', and clamping screws 54 are engaged through the slots 53 and are threadedly engaged in the longitudinal side edges of top plate 29'. Top plate 29' can be vertically adjusted by loosening the screws 54, moving the top plate 29' to its desired position of vertical adjustment, and then re-tightening the clamping screws 54. This procedure involves appropriate loosening and re-tightening of the retaining screws 39 described previously.

FIG. 8 shows an arrangement which omits the bin 17. If such a bin is employed, the vertical slots 53 would be provided so as to extend both through the flanges of the frame side bars and the respective longitudinal side walls of the bin.

While certain specific embodiments of an improved distributing device for solid material have been disclosed in the foregoing description, it will be understood that various modifications within the scope of the invention may occur to those skilled in the art. Therefore it is intended that adaptations and modifications should and are intended to be comprehended within the meaning and range of the disclosed embodiments.

What is claimed is:

1. A device for distributing solid particles of material comprising a support, first horizontal plate means fixedly mounted on said support and formed with a plurality of material-discharge apertures arranged in a predetermined geometrical configuration, second horizontal plate means fixedly mounted above said first plate means and having a plurality of material-receiving apertures arranged in the same configuration but displaced horizontally with respect to said discharge aperture configuration, middle horizontal plate means slidably disposed between said first and second horizontal plate means and having a configuration of apertures registrable alternately with said first and second-named configurations in two respective predetermined registration positions of said slidable middle plate means, guide means on the support constraining said middle plate means to horizontal movement between said registration positions, and lever means connecting said middle plate means and said support and being arranged to move the middle plate means between said registration positions responsive to operation of said lever means.

2. The distributing device of claim 1, and wherein said guide means is formed to constrain said middle plate means to substantially rectilinear movement.

3. The distributing device of claim 2, and wherein said geometrical configuration comprises rectilinear rows and columns of apertures.

4. The distributing device of claim 3, and wherein said receiving apertures have downwardly convergent receiving surfaces.

5. The distributing device of claim 1, and wherein said support comprises a horizontal frame having a plurality of depending supporting legs, whereby space is provided beneath the frame, and a rack of receiving containers movably disposed beneath the frame in said space and being arranged in a geometrical configuration substantially identical with and registering with the material-discharge apertures.

6. The distributing device of claim 1, and wherein said guide means comprises a rectangular bin mounted on said support, said first and second plate means conformably fitting in said bin, said middle plate means slidably fitting between two opposite longitudinal walls of said bin, and wherein said middle plate means has an extension projecting movably through a transverse wall of said bin.

7. The distributing device of claim 6, and means limiting sliding movement of said middle plate means substantially to the path of travel required for it to move between said two registration positions.

8. The distributing device of claim 7, and wherein said middle plate means is formed with a rectilinear slot of a length substantially equal to and extending parallel to said path of travel, and wherein said limiting means comprises fixed pin means secured to said support and extending through said slot.

9. The distributing device of claim 8, and wherein said lever means is pivoted to said support and is provided with link means connecting the lever means to said extension of the middle plate means.

10. The distributing device of claim 1, and means to adjustably clampingly secure said second plate means to said support in an elevated position relative to said middle plate means, said slidable middle plate means having a predetermined selectable thickness, and said thickness being selected to be substantially equal to the diameter of the particle to be spread.

11. A device for distributing solid particles of material comprising a support, first horizontal plate means fixedly mounted on said support and formed with a plurality of material-discharge aperatures arranged in a predetermined geometrical configuration, second horizontal plate means fixedly mounted above said first plate means and having a plurality of material-receiving apertures arranged in the same configuration but displaced horizontally with respect to said discharge aperture configuration, middle horizontal plate means slidably disposed between said first and second horizontal plate means and having a configuration of apertures registrable alternately with said first and second-named configurations in two respective predetermined registration positions of said slidable middle plate means, guide means on the support constraining said middle plate means to horizontal movement between said registration positions, and lever means connecting said middle plate means and said support and being arranged to move the middle plate means between said registration positions responsive to operation of said lever means, said support comprising a horizontal frame having a plurality of depending supporting legs defining a space beneath the frame;

a rack of receiving containers movably disposed beneath the frame in said space and arranged in a geometrical configuration substantially identical with and registering with the material-discharge apertures, said support means further provided with means for adjustably clampingly securing said second plate means relative to said first plate means whereby slidable middle plate means of varying thicknesses can be accommodated, said geometrical configuration comprising rectilinear rows and columns of apertures, said receiving apertures having downwardly receiving surfaces, said guide means comprising a rectangular bin mounted on said support, said first and second plate means fitting in said bin, said middle plate means slidably fitting between two opposite longitudinal walls of said bin, and wherein said middle plate means has an extension projecting movably through a transverse wall of said bin.

means of limiting sliding movement of said middle plate means substantially to the path of travel required for motion between said two registration positions, said middle plate means being formed with a rectilinear slot of a length substantially equal to and extending parallel to said path of travel, and wherein said limiting means comprises fixed pin means secured to said support and extending through said slot, and said lever means pivoted to said support being provided with link means connecting the lever means to said extension of the middle plate means.

* * * * *